US009451346B2

(12) United States Patent
Nishiwaki

(10) Patent No.: US 9,451,346 B2
(45) Date of Patent: Sep. 20, 2016

(54) ELECTRONIC APPARATUS AND CHASSIS WITH INCORPORATED SOUND DEVICE

(71) Applicant: KYOCERA Corporation, Kyoto (JP)

(72) Inventor: Masahiko Nishiwaki, Sakai (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 14/805,186

(22) Filed: Jul. 21, 2015

(65) Prior Publication Data

US 2015/0326961 A1 Nov. 12, 2015

Related U.S. Application Data

(63) Continuation of application No. PCT/JP2014/052064, filed on Jan. 30, 2014.

(30) Foreign Application Priority Data

Feb. 1, 2013 (JP) ................................ 2013-018008

(51) Int. Cl.
*H04R 1/02* (2006.01)
*H04M 1/03* (2006.01)

(52) U.S. Cl.
CPC ................ *H04R 1/02* (2013.01); *H04M 1/03* (2013.01); *H04M 1/035* (2013.01); *H04R 1/025* (2013.01); *H04R 2499/11* (2013.01)

(58) Field of Classification Search
CPC .......... H04R 1/02; H04R 1/025; H04R 1/08; H04R 1/28; H04R 2499/11; H04R 2499/15; H04M 1/03; H04M 1/035; H04M 1/04; H04M 1/026
USPC ......... 381/87, 333–335, 361, 365, 386, 388, 381/395
See application file for complete search history.

(56) References Cited

U.S. PATENT DOCUMENTS

2006/0037807 A1 2/2006 Hongo et al.

FOREIGN PATENT DOCUMENTS

| | | |
|---|---|---|
| JP | 2006-060398 A | 3/2006 |
| JP | 2011-029841 A | 2/2011 |
| JP | 2012-227836 A | 11/2012 |

OTHER PUBLICATIONS

International Search report dated Apr. 22, 2014 issued in counterpart International application No.: PCT/JP2014/052064.
Written Opinion of the International Searching Authority issued by Japan Patent Office for International Application No. PCT/JP2014/052064.
International Search report dated Apr. 22, 2014 issued in counterpart International application No.: PCT/JP2015/052064.
Written Opinion of the International Searching Authority issued by Japan Patent Office for International Application No. PCT/JP2015/052064.

*Primary Examiner* — Paul S Kim
*Assistant Examiner* — Sabrina Diaz
(74) *Attorney, Agent, or Firm* — Procopio Cory Hargreaves and Savitch LLP

(57) ABSTRACT

The present disclosure relates to an electronic apparatus incorporating, in its main body, a sound device that converts an electrical signal into sound or sound into an electrical signal. The electronic apparatus includes a chassis included in the main body, and a metal plate fixed to a front surface of the chassis so as to close an opening that penetrates the chassis from a back surface to the front surface. The metal plate has a through hole at a center thereof to allow sound to pass therethrough. The sound device is provided in the opening of the chassis with a front surface thereof directed towards the through hole of the metal plate, and an outer peripheral portion of the front surface of the sound device is fixed to a back surface of the metal plate.

4 Claims, 4 Drawing Sheets

F I G. 6
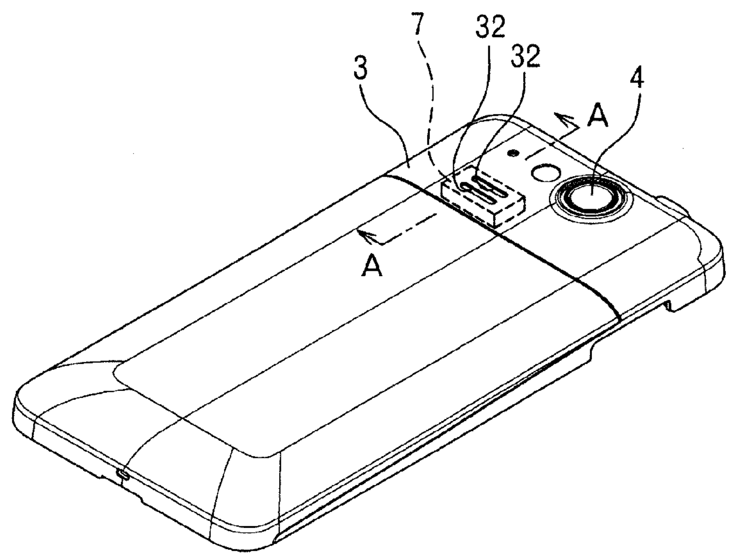
F I G. 7
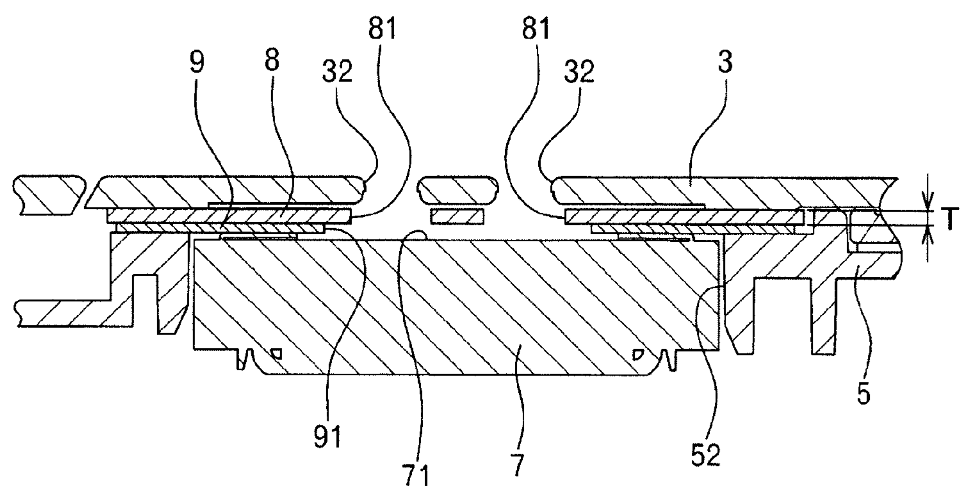

ELECTRONIC APPARATUS AND CHASSIS WITH INCORPORATED SOUND DEVICE

CROSS-REFERENCE TO RELATED APPLICATIONS

The present application is a continuation of International Application No. PCT/JP2014/052064, filed on Jan. 30, 2014, which claims the benefit of Japanese Patent Application No. 2013-018008, filed on Feb. 1, 2013. International Application No. PCT/JP2014/052064 is entitled "ELECTRONIC DEVICE", and Japanese Patent Application No. 2013-018008 is entitled "ELECTRONIC APPARATUS INCORPORATING SOUND DEVICE". The contents of which are incorporated herein by reference in their entirety.

FIELD

Embodiments of the present disclosure relate to an electronic apparatus incorporating a sound device that converts an electrical signal into sound or sound into an electrical signal.

BACKGROUND

A mobile phone typically incorporates a speaker in its main body. When an incoming call is received, the speaker sounds to inform a user of the incoming call.

SUMMARY

An electronic apparatus is disclosed. In one embodiment, an electronic apparatus includes a chassis, a sound device, and a metal plate. The chassis has an opening that penetrates the chassis from a back surface to a front surface. The sound device is incorporated in the chassis, and converts an electrical signal into sound or sound into an electrical signal. The metal plate is fixed to the front surface of the chassis so as to close the opening, and has a through hole at a center thereof to allow sound to pass therethrough. The sound device is located in the opening of the chassis with a front surface thereof directed toward the through hole of the metal plate. An outer peripheral portion of the front surface of the sound device is fixed to a back surface of the metal plate.

BRIEF DESCRIPTION OF DRAWINGS

FIG. 6 illustrates a perspective view showing the back-side main body part covered with a back-side cover panel.

FIG. 7 illustrates an enlarged sectional view taken along the line A-A of FIG. 6.

DETAILED DESCRIPTION

Embodiment 1

The following describes a detail of a mobile phone in one embodiment of the present disclosure in line with the drawings.

Figure 1:
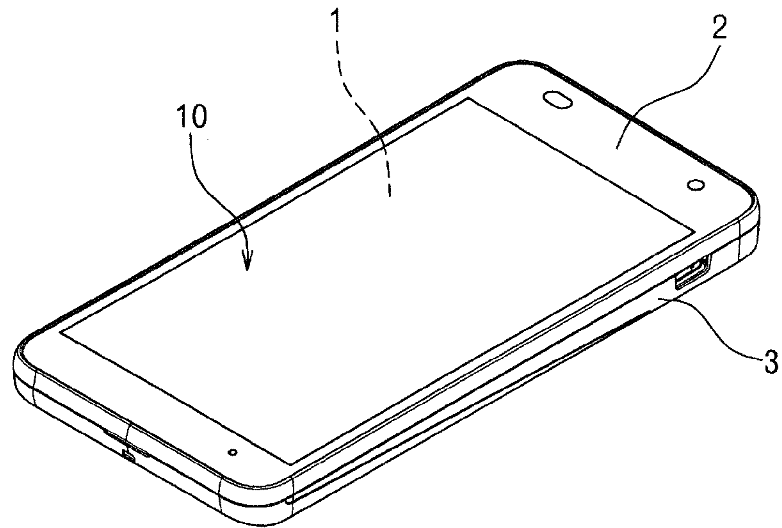
FIG. 1 illustrates a perspective view showing a front side of a mobile phone in one embodiment of the present disclosure.
Figure 2:
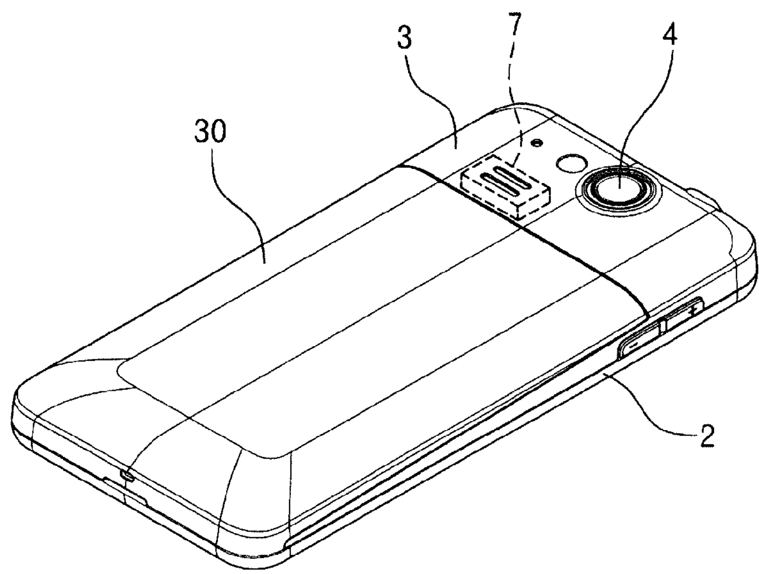
FIG. 2 illustrates a perspective view showing a back side of the mobile phone.

As illustrated in FIGS. 1 and 2, the mobile phone in one embodiment of the present disclosure includes a main body 1, a front-side cover panel 2, and a back-side cover panel 3. The main body 1 incorporates a speaker 7 for indicating an incoming call. The front-side cover panel 2 and the back-side cover panel 3 respectively cover the front side and the back side of the main body 1. A screen 10 is exposed from the front-side cover panel 2. A photographing lens 4 is exposed from the back-side cover panel 3. The back-side cover panel 3 includes a detachable battery cover 30.

Figure 3:
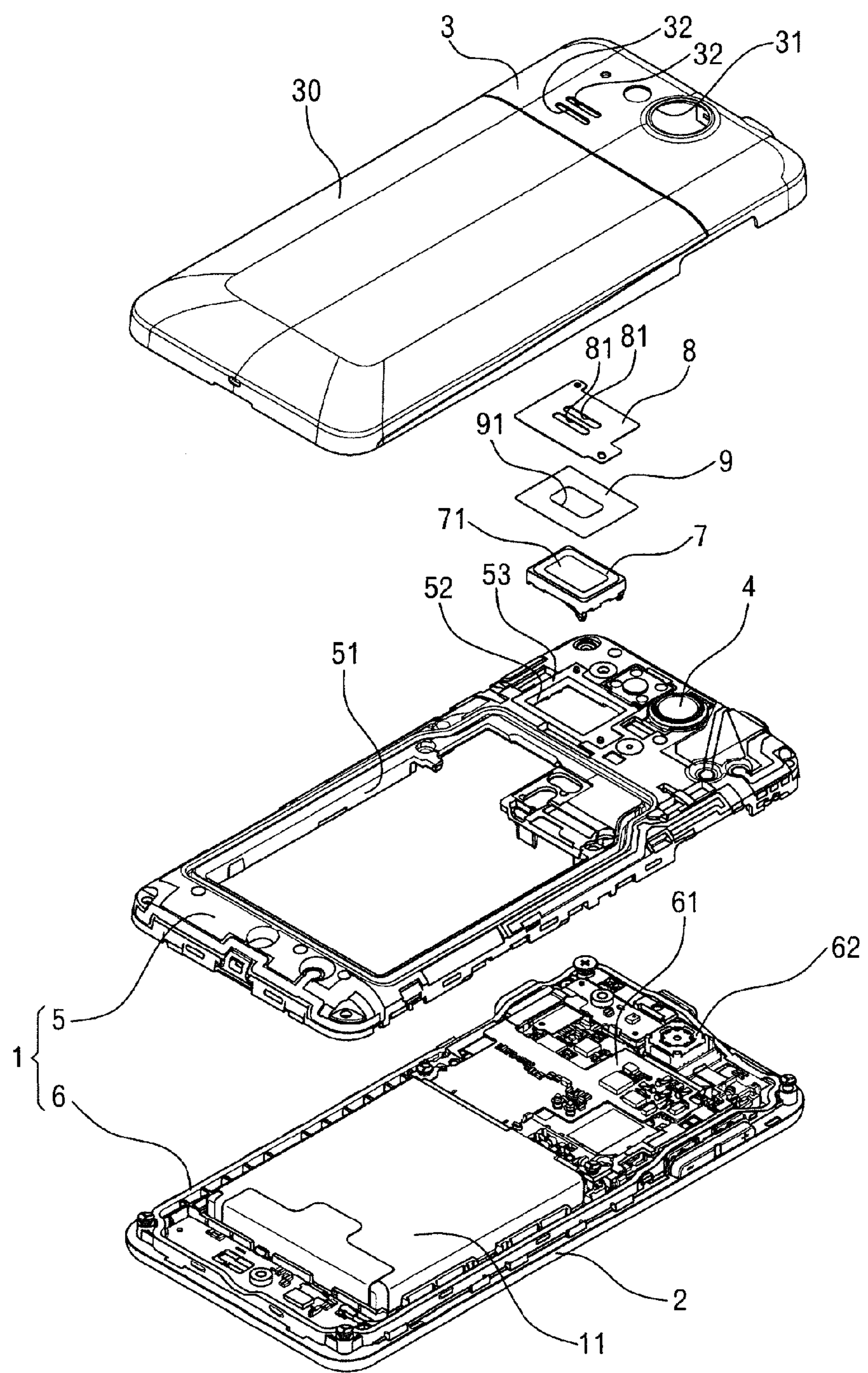
FIG. 3 illustrates an exploded perspective view of the mobile phone.

As illustrated in FIG. 3, the main body 1 includes a back-side main body chassis 5 and a front-side main body chassis 6 that are joined together and are made of synthetic resin. The main body chassis are not limited to those made of synthetic resin, and may be made of metal, for example.

The back-side main body chassis 5 has a surrounding wall 51 surrounding a housing for housing a battery 11. An opening 52 in which the speaker 7 is to be provided has been formed so as to penetrate the back-side main body chassis 5 from a back surface to a front surface. The photographing lens 4 is disposed beside the opening 52.

A circuit board 61 is disposed on a back surface of the front-side main body chassis 6. A camera 62 is disposed so as to face the photographing lens 4 of the back-side main body chassis 5.

The back-side cover panel 3 has a window 31 from which the photographing lens 4 is exposed. The back-side cover panel 3 has two sound emitting holes 32 to emit therethrough sound from a sound emitting surface 71 provided on the front side of the speaker 7.

The front surface of the back-side main body chassis 5 includes an installation surface 53 surrounding the opening 52. A metal plate 8 that has two through holes 81 and is made of stainless steel as designated in International Standards ISO 15510-4301-304-00-I (corresponding to Japanese Industrial Standards SUS304) is provided to the installation surface 53. Double-sided adhesive tape 9 having a central opening 91 is disposed between the front surface of the back-side main body chassis and a back surface of the metal plate. With the double-sided adhesive tape 9, an outer peripheral portion of the back surface of the metal plate 8 is fixed to the installation surface 53 of the back-side main body chassis 5.

The double-sided adhesive tape 9 is stuck to an outer peripheral portion of a front surface of the speaker 7 around the sound emitting surface 71, and, with the double-sided adhesive tape 9, the speaker 7 is fixed to an inner peripheral portion of the back surface of the metal plate 8.

Figure 4:
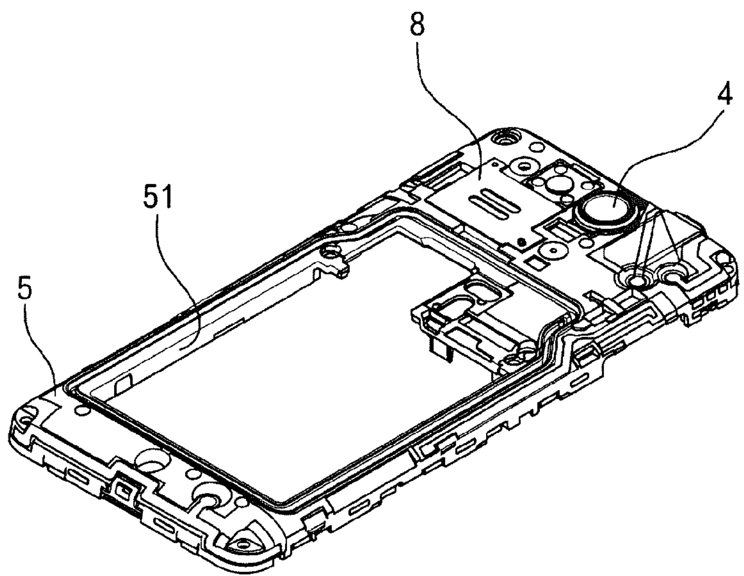
FIG. 4 illustrates a perspective view showing a front surface of a back-side main body part.
Figure 5:
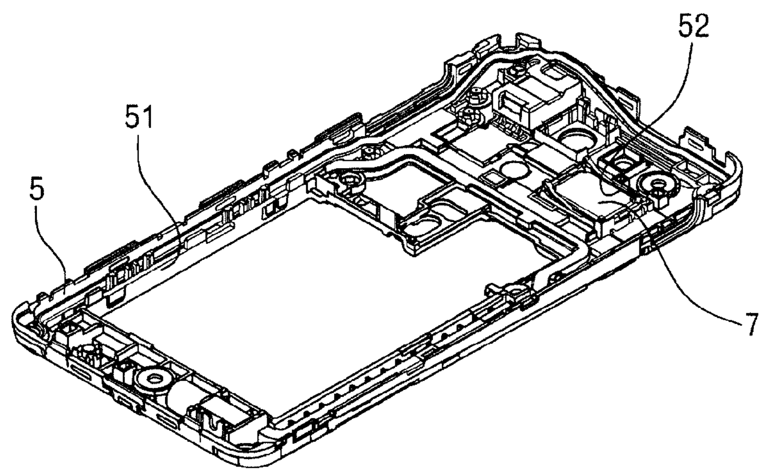
FIG. 5 illustrates a perspective view showing a back surface of the back-side main body part.

With the above-mentioned structure, the metal plate 8 and the speaker 7 are fixed to the back-side main body chassis 5 as illustrated in FIGS. 4 and 5.

In this state, almost whole of the speaker 7 is housed in the opening 52 of the back-side main body chassis 5 as illustrated in FIGS. 6 and 7. Sound emitted from the sound emitting surface 71 is emitted to the outside through the central opening 91 of the double-sided adhesive tape 9, the two through holes 81 of the metal plate 8, and the two sound emitting holes 32 of the back-side cover panel 3.

According to the above-mentioned mobile phone, as illustrated in FIG. 7, the back-side main body chassis 5 has the opening 52, and the speaker 7 is fixed to the metal plate 8 provided so as to close the opening 52. Compared to a conventional mobile phone in which the speaker is fixed to the back-side main body chassis, the mobile phone can be made thin by the difference between the thickness T (e.g., 0.3 mm) of the metal plate 8 and the thickness (e.g., 0.8 mm) of the back-side main body chassis 5.

Even when a region around the two sound emitting holes 32 of the front-side cover panel 2 is pressed with strong force, the force is received by the metal plate 8, and the metal plate 8 is hardly deformed. As a result, damage to the speaker 7 and detachment of the speaker 7 from the metal plate 8 can be suppressed.

The double-sided adhesive tape 9 functions as a waterproof packing, and thus infiltration of water from the two sound emitting holes 32 of the back-side cover panel 3 into the main body 1 through the opening 52 of the back-side main body chassis 5 is suppressed.

Furthermore, when the metal plate 8 is made of magnetic metal as designated in International Standards ISO 15510-4016-430-00-I (corresponding to Japanese Industrial Standards SUS430), leakage magnetic flux generated forward from the speaker 7 is absorbed by the metal plate 8, leading to suppression of an adverse effect of the leakage magnetic flux on an external apparatus.

Components of the present disclosure are not limited to those described in one embodiment above, and various modifications can be made within the technical scope described in the claims. For example, although the speaker 7 that converts an electrical signal into sound is described as an example of the sound device, the sound device is not limited to the speaker 7. The present disclosure is applicable to the structure in which a microphone that converts sound into an electrical signal is attached, and effects similar to those obtained in the above-mentioned structure in which the speaker 7 is attached can thereby be obtained. The speaker may be a film speaker, for example.

The present disclosure is not limited to the mobile phone, and is applicable to various electronic apparatuses incorporating sound devices that convert electrical signals into sound or sound into electrical signals.

The invention claimed is:

1. An electronic apparatus comprising:

a chassis comprising an opening that penetrates the chassis from a back surface to a front surface;

a sound device incorporated in the chassis, and converting an electrical signal into sound or sound into an electrical signal; and a metal plate fixed to the front surface of the chassis so as to close the opening, and comprising a through hole at a center thereof to allow sound to pass therethrough, wherein the sound device is located in the opening of the chassis with a front surface thereof directed toward the through hole of the metal plate, and an outer peripheral portion of the front surface of the sound device is fixed to a back surface of the metal plate.

2. The electronic apparatus according to claim 1, wherein at least part of the sound device is housed in the opening of the chassis.

3. The electronic apparatus according to claim 1, wherein double-sided adhesive tape is disposed between the front surface of the chassis and the back surface of the metal plate, the double-sided adhesive tape comprising an opening at a center thereof, and with the double-sided adhesive tape, an outer peripheral portion of the back surface of the metal plate is fixed to the front surface of the chassis, and the outer peripheral portion of the front surface of the sound device is fixed to an inner peripheral portion of the back surface of the metal plate.

4. The electronic apparatus according to claim 1, wherein the metal plate is made of a magnetic material.

* * * * *